Dec. 17, 1940. L. A. DUNKELBERGER ET AL 2,224,953

WELDING AND REGALVANIZING PROCESS

Filed Jan. 20, 1938 2 Sheets-Sheet 1

Inventors
LELAND A. DUNKELBERGER,
CLINTON BOWSHER,
by
Attorneys

Dec. 17, 1940.        L. A. DUNKELBERGER ET AL        2,224,953
WELDING AND REGALVANIZING PROCESS
Filed Jan. 20, 1938        2 Sheets-Sheet 2
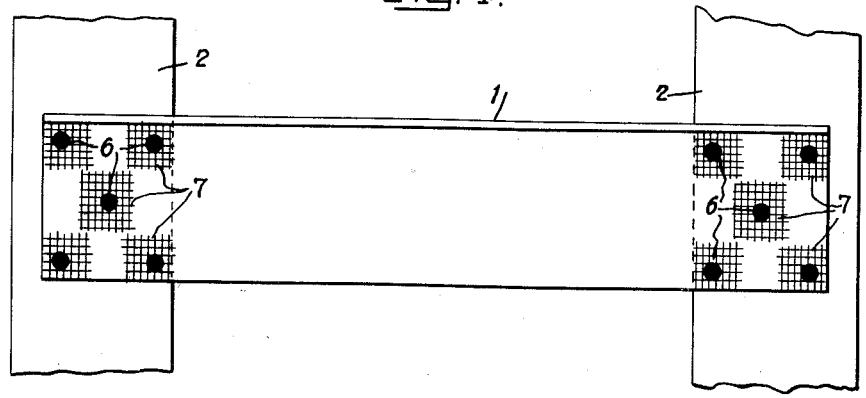
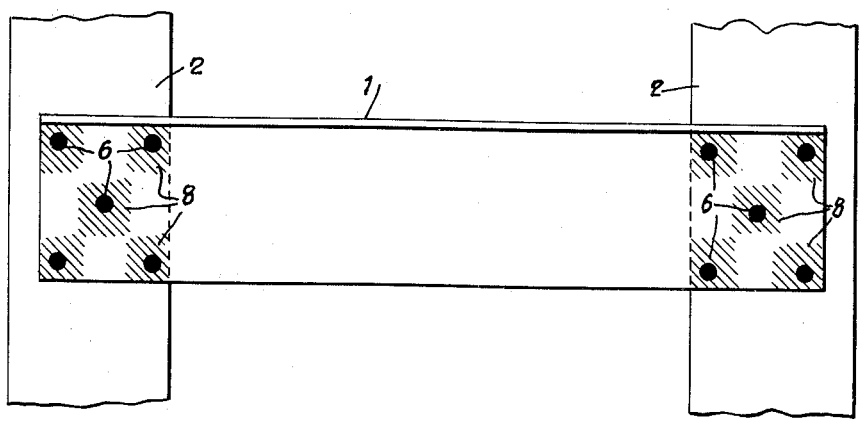
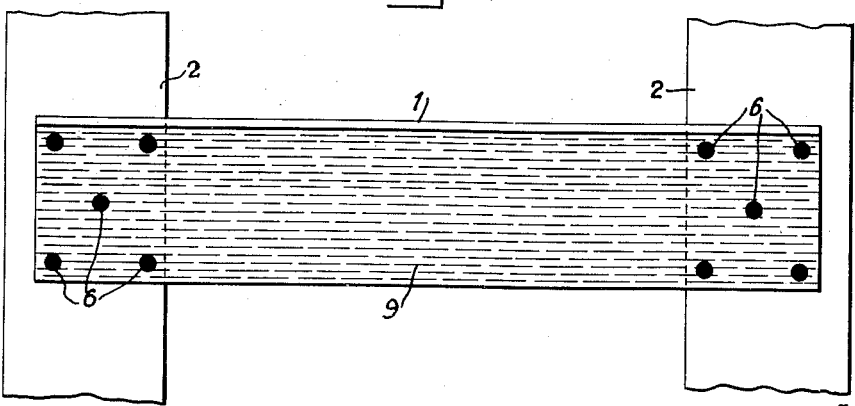
LELAND A. DUNKELBERGER,
CLINTON BOWSHER,
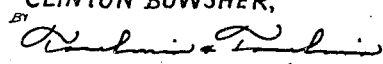

Patented Dec. 17, 1940

2,224,953

UNITED STATES PATENT OFFICE 2,224,953

WELDING AND REGALVANIZING PROCESS

Leland A. Dunkelberger and Clinton Bowsher, Lima, Ohio, assignors to The Artkraft Sign Company, Lima, Ohio, a corporation of Ohio Application January 20, 1938, Serial No. 185,941

5 Claims. (Cl. 219—10)

This invention relates to a method of galvanizing or regalvanizing articles or structures containing stored-up heat derived from welding together the parts of the structure.

This method comprises the following major steps:

First, the step of welding together the parts to be galvanized or regalvanized; second, the step of utilizing the heat derived from said welding operation, which prepares the surface to be galvanized or regalvanized; third, the step of applying the galvanizing or regalvanizing material to the hot surface in which said heat has been so stored up; fourth, the step of using a suitable instrumentality to so apply the galvanizing or regalvanizing material to said heated surface; fifth, the step of applying the regalvanizing material to such parts of the surface of the object under treatment as had theretofore been galvanized prior to the welding step but had been burned off substantially or wholly by the high welding heat, in which case we regalvanize such surface; or sixth, the step of spreading the galvanizing or regalvanizing material on the surfaces to be treated by an instrumentality capable of spreading the molten material over said surface in a film-like coating.

In the accompanying drawings:

Figure 4 is a view similar to Figure 1 but illustrates steel or iron bars or plates of a thinner guage, and indicates by the black dots that with this thinner material we prefer to employ "spot" welding, the cross-lines indicating the areas where the original galvanizing material has been burned off.

Figure 5 is a view similar to Figure 2, but illustrates steel or iron bars of a thinner guage, with the regalvanizing material applied to the burnt-off areas after the bars have been spot welded together.

Figure 6 is a view similar to Figure 3 but with the thinner guage bars or plates, showing the application of the galvanizing material to parts which had never been galvanized before.

Figure 1:
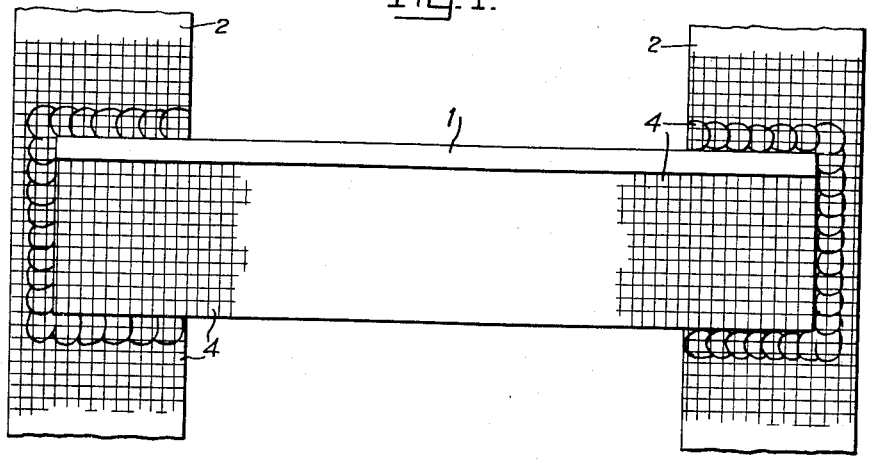
Figure 1 is a plan view of parts of those steel or iron bars or plates in the stage of having been welded together with a welding rod or other welding material, showing the galvanizing material burned off in part and the raw iron or steel left, as shown by the lined areas.

*Arc welding.*—We are aware that there are several species of arc-welding, as for instance, one known as the Bernardos process; another, known as the Slavianoff process, and a third known as the Zerener process. But we wish it to be understood, however, that we may practice our method with any system of welding of the parts, whether by electric current or acetylene flame or, in fact, we may employ any welding system which will cause the temperature of the steel or iron bars or plates, or other parts to also afford sufficient heat to melt the galvanizing material. This constitutes our first step.

When the welding step has been completed, the bars, sheets, or plates will be found to have been injured by the melting or burning off of the galvanizing material with which they are galvanized at the time of their manufacture. See the fifth step of our process mentioned above. This condition of bareness of the metal exposes it to rust and oxidation and leaves the metal surfaces more or less rough and unsightly.

The next thing is to treat the bars or plates where they are joined together to Step 2 of our method which we have expressed in this language:

"The step of utilizing the heat derived from said welding operation, which prepares the surface to be galvanized or regalvanized."

Depending upon the system employed in our method to effect the welding step, we sometimes apply a welding rod that will melt from the welding heat and will flow or work its way between the surfaces to be joined. See the numeral 3 on Figure 2.

We have found by actual use that we can weld the bars or plates together by applying to them, say in the angles between the different parts, a standard welding rod, which will melt and adhere to all of the surfaces in contact with it. We can thus unite the parts by the action and adhesion to the parts of this mass 3 of material melted from the welding rod. We prefer to sufficiently heat the bars or plates by treating them to the action of an electric current in the manner practiced in arc welding, whereby the heat of the parts acts on the material in the standard welding rod. As the end of the rod sloughs off in a liquid-like condition it is smeared on and against the parts to be welded and in this way the parts are made hot enough to apply the solder or other galvanizing material whereby to re-galvanize such parts as have been burned off by the heat of the operation. If the material has been previously galvanized, then the re-galvanizing may be designated by the angular lines shown at 4a in Figure 2. If the parts had never been galvanized, then the galvanizing material is nevertheless applied to the parts and this first galvanizing is indicated by the numeral 5.

But our process does not necessarily embrace this mass of welding material designated at 3. We prefer to cover it with our galvanizing or re-galvanizing material so as to envelop any rust-giving elements that may be in the rod or in this mass.

Referring now to our third, fourth, fifth and sixth steps, which we here summarize, we apply the galvanizing or regalvanizing material (which are preferably of the same ingredients) to all and every part of the structure formed of the bars or plates which have not theretofore been galvanized; or in the case of where the bars or plates were galvanized, not as a structure or structures but as material from which to erect structures (which is commonly done by dipping the iron or steel material into a bath of hot molten galvanizing material) we apply our re-galvanizing material to all parts or portions of the structure where the original galvanizing has been burned off, or injured by the heat of the step of welding.

To this end we take a bar of galvanizing or regalvanizing material, such as solder, and stroke it back and forth, in contact with the portions of the areas to be galvanized or regalvanized. The welding heat in the structure is at that time still quite high, high enough to produce a melting action on the galvanizing or regalvanizing material. This application of the galvanizing material in a liquid state roughly coats the parts under treatment. We then use an instrumentality, such as a brush with bristles, and draw it briskly over and upon such liquid coated surfaces. During these operations the galvanizing or regalvanizing material has become hot and of a thin consistency like thin paint compared with thick paint, which quality insures that the molten galvanizing material will enter all parts of the surfaces under treatment, places slightly rough as well as places perfectly smooth.

The brisk spreading of the hot galvanizing material on the hot bars reduces this material to so thin a state that the galvanizing or regalvanizing coating becomes almost as liquid as water, and makes the coating so thin that any margin or edge of the coating does not form a ridge or shoulder, which latter, if exposed to a slight contact with a fixed object, would cause the coating to be lifted or peeled off. But in the case of our galvanizing or regalvanizing material and its treatment here explained, it forms a film-like coating, which while hot or cold adheres skin-like to the structure to which it is applied. This material also, in a degree, penetrates through the surface of the structure and embeds itself in the structure to that extent.

Again, while we have found a brush with steel bristles to be desirable and effective, still we wish to be understood as contemplating the use of any other instrumentality suitable for this purpose.

Referring to the drawings, Figure 1, through its cross-lines, indicates that the previous galvanizing of the material was burned off, as shown at 4, from the heat of the welding. The numeral 1 represents one bar of the illustrative structure, and 2 indicates the cross-bars.

Figure 2:
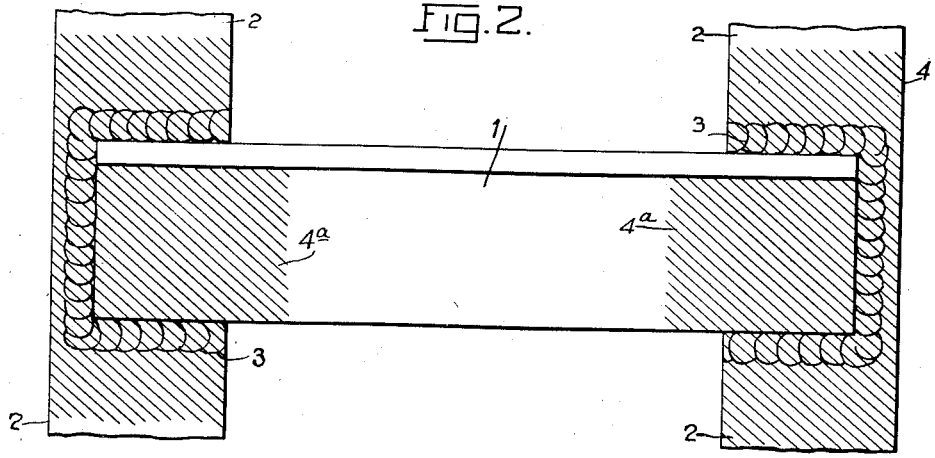
Figure 2 is a view of the same parts, with the regalvanizing material applied to the burnt-off areas, as shown by the lines at angles.

In Figure 2 we show the same assumed structure but in the condition of having been regalvanized at the parts indicated by the numeral 4a.

Figure 3:
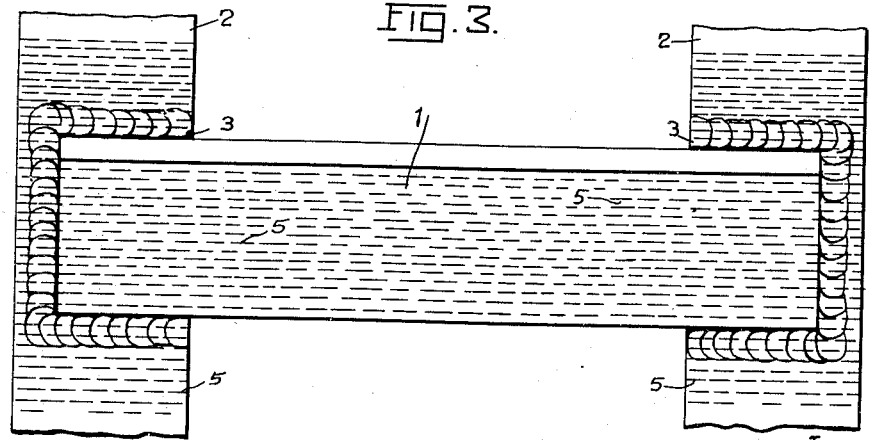
Figure 3 is another similar view in a situation in which no galvanizing material has ever been applied to the article until after the welding step has been accomplished, which galvanizing is indicated by the horizontal broken lines; and with the welding material to re-enforce the strength of the welded joint, also shown.

In Figure 3 the same assumed structure is shown and it represents by the broken lines the application of an original galvanizing, as distinguished from a regalvanizing, because in Figure 3 the parts had never been galvanized until after the welding was performed.

It will be understood from this that our method is applicable to a regalvanization after an original galvanization has been burned off or more or less destroyed by the heat of the welding step; and further under our method a structure never galvanized before being electrically welded, is completely galvanized as indicated by the numeral 5 in Figure 3.

As we have so far described our method we have not made reference to the use of a flux or fluxing material to promote fusion of the metals, such as borax, lime, or alkalis which promote metal fusion. We wish it to be understood from this specification that the use of a flux appropriate for the purpose may be used by us, though we prefer as a general thing not to resort to it.

Referring to Figures 4, 5 and 6 of the drawings, they exhibit our invention when the bars or plates are of relatively thin guage metal.

In dealing with this thin guage metal, we prefer to employ spot welding, which is indicated by the black dots designated 6. The areas where the original galvanization of the structure has been burned off by the heat incident to the spot welding are indicated by the cross-lines 7 in Figure 4.

In Figure 5, we show by the angle lines 8 the regalvanization, particularly in the neighborhood of the spots where the heat of welding has been hottest.

In Figure 6 we show by the horizontal broken lines on the thin guage bars or plates the coating of galvanizing material, essentially over the whole area, because in this instance the material has not been theretofore galvanized. Such lines are indicated at 9.

Thus we carry out this same procedure or the same steps when the material being welded together is relatively thick or relatively thin.

It will be understood that the above described invention is capable of modification and that we, therefore, desire to comprehend as within our invention any modification that will come within the scope of our claims and this invention.

Having thus fully described our invention what we claim is new and desire to secure by Letters Patent is:

1. In a method of welding and galvanizing or regalvanizing structures, the following steps: (1) electrically welding together structural elements; (2) utilizing the heat in said elements created by the step of welding; (3) applying solder or other galvanizing material from an external source to the surface of the then hot welded elements and using only the heat contained within the elements to melt the galvanizing material; and (4) spreading such galvanizing material on the surface of the elements lacking galvanization.

2. In a method of welding and galvanizing or regalvanizing structures, the following steps: (1) electrically welding together structural elements; (2) utilizing the heat of said elements created by the step of welding; (3) applying a bar of solder or other galvanizing material by operating the bar back and forth on the surface of the then hot welded elements and using only the heat contained within the elements to melt the galvanizing material; and (4) spreading with an instrumentality the now hot galvanizing material back and forth on the surfaces lacking galvanization.

3. In a method of welding and galvanizing or regalvanizing comparatively thin structural elements, the following steps: (1) spot welding together such comparatively thin structural elements to effect their interconnection; (2) applying solder or other galvanizing material from an external source to the then hot welded elements and using only the heat contained within the metal parts; and (3) spreading such galvanizing material on the surfaces about the spot welds and which lack galvanization, whereby said elements become strongly fastened together and are galvanized over the entire welded surfaces.

4. The method of making a welded joint between metal parts thicker than sheet metal which comprises the steps of depositing a quantity of weld metal along the joint, applying a bar of solder and a flux to the weld while it is in a heated condition and using only the heat contained within the metal parts, and brushing the joint to diffuse the solder into the weld metal of the joint.

5. In a method of welding and galvanizing or regalvanizing heavy structural elements, the following steps: (1) bringing the elements into welding position; (2) electrically welding the elements at a temperature sufficiently high to melt galvanizing material presented in cold stick form to any surface of the elements positioned in the region of the weld; (3) applying the stick of galvanizing material in cold form to the surface of the then hot welded elements and using only the heat contained within the elements to melt the galvanizing material and to spread the material over the surface of the elements.

LELAND A. DUNKELBERGER.
CLINTON BOWSHER.